United States Patent [19]

Hornung et al.

[11] Patent Number: 5,441,668
[45] Date of Patent: Aug. 15, 1995

[54] SMECTIC LIQUID-CRYSTAL MIXTURE

[75] Inventors: Barbara Hornung, Hasselroth; Dietmar Jungbauer, Weiterstadt; Javier Manero, Frankfurt am Main, all of Germany

[73] Assignee: Hoechst Aktiengesellschaft, Frankfurt, Germany

[21] Appl. No.: 224,145

[22] Filed: Apr. 7, 1994

[30] Foreign Application Priority Data

Apr. 10, 1993 [DE] Germany .................. 43 11 967.0

[51] Int. Cl.6 .................. C09K 19/52; C09K 19/34; G02F 1/13
[52] U.S. Cl. .................. 252/299.01; 252/299.61; 252/299.63; 252/299.64; 252/299.65; 252/299.66; 252/299.67; 359/104
[58] Field of Search .................. 252/299.01, 299.61, 252/299.63, 299.64, 299.65, 299.66, 299.67; 359/104

[56] References Cited

U.S. PATENT DOCUMENTS

| | | | |
|---|---|---|---|
| 4,988,459 | 1/1991 | Scherowsky et al. | 252/299.61 |
| 5,328,638 | 7/1994 | Müller et al. | 252/299.61 |

FOREIGN PATENT DOCUMENTS

| | | |
|---|---|---|
| 0292954 | 11/1988 | European Pat. Off. . |
| 0351746 | 1/1990 | European Pat. Off. . |
| 0361272 | 4/1990 | European Pat. Off. . |
| 0365820 | 5/1990 | European Pat. Off. . |
| 0541081 | 5/1993 | European Pat. Off. . |
| 0578054 | 1/1994 | European Pat. Off. . |
| 0603786 | 6/1994 | European Pat. Off. . |
| 4116751 | 11/1992 | Germany . |
| 92/12974 | 8/1992 | WIPO . |
| 93/13093 | 7/1993 | WIPO . |

OTHER PUBLICATIONS

Hoechst Aktiengesellschaft application identified as HOE 88/F 179.
Hoechst Aktiengesellschaft application identified as HOE 88/F 266.
Hoechst Aktiengesellschaft application identified as HOE 91/F 352.
German Abstract No. 4116751-A published May 23, 1991.
Hoechst Aktiengesellschaft application identified as HOE 92/F 207.
Hoechst Aktiengesellschaft application identified as HOE 92/F 426.

*Primary Examiner*—Shean Wu
*Attorney, Agent, or Firm*—Curtis, Morris & Safford

[57] ABSTRACT

Smectic liquid-crystal mixture A liquid-crystalline mixture comprises, inter alia A. at least one compound of the formula I

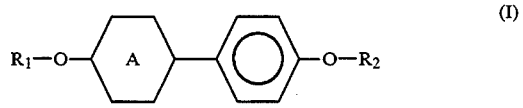

and/or at least one compound of the formula (II)

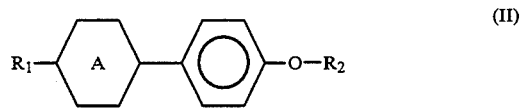

B. at least one compound of the formula (III)

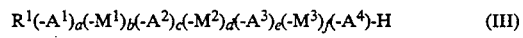

C. and at least one compound of the formula (IV)

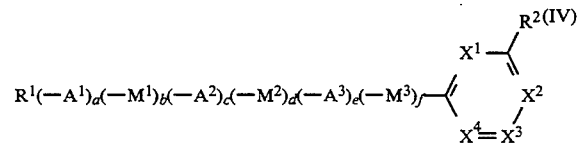

The mixture has a low melting point and a broad $S_c$ phase range.

10 Claims, No Drawings

SMECTIC LIQUID-CRYSTAL MIXTURE

The invention relates to a smectic, in particular a ferroelectric, liquid-crystal mixture based on phenylpyrimidine derivatives.

Due to their unusual combination of anisotropic and fluid behavior, liquid crystals (LCs) have found a multiplicity of possible applications in electro-optical switching and display devices.

In addition to the nematic liquid-crystal phases which have been employed for some time, smectic liquid-crystal phases, in particular ferroelectric liquid crystals (FLCs), have increasingly also been used recently.

For practical use of ferroelectric liquid crystals in electro-optical switching and display devices, chiral, tilted, smectic phases, such as $S^*_c$ phases, are required (see, for example, R. B. Meyer, L. Liebert, L. Strzelecki and P. Keller, J. Physique 36, L-69 (1975)), which are stable over a large temperature range. This aim can be achieved by means of compounds which themselves form such phases or, however, by doping compounds which form achiral, tilted, smectic phases with optically active compounds [see, for example, M. Brunet, C. Williams, Ann. Phys. 3, 237 (1978)].

Switching and display devices which contain ferroelectric liquid-crystal mixtures ("FLC light valves") have been disclosed, for example, in EP-B 0 032 362 (=US-A 4,367,924). LC light valves are devices which, for example due to electrical switching, change their optical transmission characteristics in such a way that incident (and possibly re-reflected) light is modulated in intensity. Examples are the known watch and calculator displays or LC displays in the area of office communication and television. However, these also include light shutters, as employed, for example, in photocopiers and printers. Spatial light modulators are also areas of application of LC light valves (see Liquid Crystal Device Handbook, Nikkan Kogyo Shimbun, Tokyo, 1989; ISBN 4-526-02590-9C 3054, and the papers cited therein).

The electro-optical switching and display devices mentioned are generally constructed in such a way that the FLC layer is surrounded on both sides by layers which are usually, in this sequence starting from the FLC layer, at least one alignment layer, electrodes and a limiting plate (for example made of glass). In addition, they contain at least one polarizer if they are operated in "guest-host" mode or in reflective mode, or two polarizers if the transmissive birefringence mode is used. The switching and display elements may, if desired, contain further auxiliary layers, such as, for example diffusion barrier layers or insulation layers. The abovementioned alignment layers are usually rubbed films of organic polymers or obliquely vapor-deposited silicon oxide and vary from one display manufacturer to the next.

At a sufficiently small separation of the limiting plates, the alignment layers bring the FLC molecules into a configuration in which the molecules lie with the long axes parallel to one another and the smectic planes are arranged perpendicular or inclined to the alignment layer. In this arrangement, the molecules are known to have two equivalent alignments, between which they can be switched by applying an electric field in a pulsed manner.

In order to achieve a uniform planar alignment in the $S^*_c$ phase over the entire display, it is advantageous for the phase sequence of the liquid-crystal mixture to be as follows, with decreasing temperature: isotropic-nematic-smectic A-smectic C (see, for example, K. Flatischler et al., Mol. Cryst. Liq. Cryst. 131, 21 (1985); T. Matsumoto et al., pp. 468–470, Proc. of the 6th Int. Display Research Conf., Japan Display, 30 September–2 October 1986, Tokyo, Japan; M. Murakami et al., ibid pp. 344–347).

In addition, for ferroelectric (chiral, smectic) liquid-crystal mixtures, the condition must be satisfied that the pitch of the helix is sufficiently large in the $S^*_c$ phase to prevent the formation of a helix in the display and is so large in $N^*$ displays that the cooling process in the display is not accompanied by formation of a twisted state, but instead by formation of a homogeneous, nematic phase. The formation of a uniform, planar alignment in the display is necessary to achieve high contrast.

The to-and-fro switching of the molecules (and thus bright or dark setting for a fixed polarizer setting) takes place, as mentioned above, due to pulsed application of an electric field. Owing to the histability of the FLC molecules, voltage must only be present for an alignment change. A subdivision of the display into individual pixels is achieved by the known matrix arrangement of the electrodes. The electrodes are generally on the insides of the outer plates of the display, with lines on one outer plate and the columns on the other. In the crossover areas, the pixels B, the liquid crystal between lines and columns is switched. A basic description of multiplex addressing for FLC displays is given, for example, in Proc. SID 28/2, 211 (1978), and Ferroelectrics 94, 3 (1989). The response time T of the FLC mixture in the display is inversely proportional to the spontaneous polarization $P_s$ and is in the region of microseconds.

$$T = \frac{\rho}{P_s \cdot E}$$

E=strength of the applied electric field $\eta$=rotational viscosity

In addition to the spontaneous polarization, the tilt angle $\theta$, i.e. the angle between the n-director, i.e. the average molecule direction, and the layer normals, is of considerable importance. Together with the birefringence $\Delta n$ and the layer thickness d, it affects the brightness of the display in accordance with the relationship:

$$T = T_o \sin^2(4\theta) \cdot \sin^2\left(\frac{\pi \cdot \Delta n \cdot d}{\lambda}\right)$$

where $T_o$ is the intensity and $\lambda$ the wavelength of the incident light.

In the case of a matrix arrangement of the electrodes in the display, the columns are usually the electrodes to which information-carrying pulses (also known as column or data pulses) are supplied. The lines are then activated sequentially in a stroboscope-like manner by electric pulses, which is the prerequisite for information transfer to the pixels of the lines. An important property of the display is the time necessary for building up or changing an image. For many applications, it should be as short as possible.

Since the lines are addressed sequentially, a crucial factor is the time for which a line has to be addressed to enter information. This writing time is shorter, the shorter the voltage pulses necessary for switching the liquid crystal. In general, the maximum voltage which has to be applied is prescribed by the choice of driver, so that the pulse width necessary for switching should be kept as small as possible.

To good approximation, the product of the requisite pulse width and voltage (=pulse height) is constant, i.e. independent of the voltage, so that the pulse area just necessary for switching (CPA=critical pulse area) represents a parameter which characterizes the speed of the liquid crystal well. The CPA should be as small as possible.

It is furthermore advantageous for the LC mixture in the display to have a high margin and low flicker (J. Dijon et al., Ferroelectrics 113 (1991) 371). Margin is taken to mean the voltage range, for a given addressing scheme, in which the pulse height must be so that the LC mixture switches fully. The margin is affected by the bias, i.e. the ratio of line and data pulse voltage. The margin should be as large as possible in order to compensate for thickness and temperature variations in the display. In the case of multiplex addressing, the molecules of the unselected lines experience a deflection from their rest state due to the data pulses and then relax again. The variation in brightness caused by this is known as flicker. The flicker results in a reduction in contrast. Rieker et al. [Phys. Rev. Lett. 59, 2658 (1987)] have shown that, on cooling from the isotropic phase through the $S_A$ phase, the $S_c$ phase in displays forms a so-called chevron geometry, i.e. the layers are bent. For this reason, the effective tilt angle $\theta_{eff}$ must be employed in the above relationship between the tilt angle and transmission. The effective tilt angle is the angle between the projections of smectic normals and the optical axis of the liquid crystal onto the glass surface of the cell.

A display can either be operated in the chevron geometry which forms naturally during the cooling operation or in the so-called quasi-bookshelf geometry (QBG), into which the liquid crystal can be brought by specific field treatment (see, for example, H. Rieger et al., SID 91 Digest (Anaheim) 1991, p. 396).

It is almost impossible to achieve good values for the majority of the abovementioned parameters using individual substances. For this reason, mixtures of various substances have been used for some time. Such mixtures generally comprise an achiral base mixture and optically active dopes.

The achiral base mixture should ensure a broad $S_c$ phase in a favorable temperature range. Furthermore, the achiral base mixture should have phase sequence I-N-$S_A$-$S_c$ and the lowest possible melting point. The optically active dopes then serve to induce ferroelectricity in the mixture, for pitch compensation and for matching of the optical and dielectric anisotropies.

It is known that certain derivatives of phenylpyrimidine, in particular 5-alkyl-2 - (4-alkoxyphenyl) pyrimidines, can form $S_c$, $S_A$ and N phases (D. Demus and H. Zaschke, "Flüssigkristalle in Tabellen" [Liquid Crystals in Tables], VEB Deutscher Verlag für Grundstoffindustrie, Leipzig 1974, pp. 260–261) and in addition can be converted into FLC mixtures by addition of optically active dopes [M. L. Blinov et al., Sov. Phys. Usp. 27(7), 492 (1984); L. A. Beresnev et al., Ferroelectrics 59 [321]/1 (1984), paper at the 5th Conference of Soc. Countries in Liquid Crystals, Odessa, USSR, Oct. 1983; DE-A 35 15 347, EP-A 0 206 228, EP-A 0 225 195]. It is furthermore known that lower melting points and a broadening of the desired liquid-crystalline phases are achieved by mixing a plurality of LC compounds [see, for example, D. Demus et al., Mol. Cryst. Liq. Cryst. 25, 215 (1974); J. W. Goodby, Ferroelectrics 49, 275 (1985) ], and that the melting point depression is more pronounced the greater the structural differences between the mixture components (see, for example, J. S. Dave et al., J. Chem. Soc. 1955, 4305) .

In spite of the successes achieved by the mixtures hitherto in the provision of novel LC materials, the development of LC base mixtures, but in particular also of FLC mixtures, can in no way be regarded as complete.

The manufacturers of display elements ("displays") continue to be interested in a broad range of different mixtures for diverse areas of application.

SUMMARY OF THE INVENTION

The object of the present invention is therefore to provide compositions comprising suitable components for achiral LC base mixtures, but in particular for FLC mixtures. These mixtures should satisfy as many of the abovementioned criteria as possible, in particular should have high contrast, good alignment, a large margin, low flicker, a large angle in the chevron geometry and a low melting point with the highest possible $S^*_c/S_A$ phase transition temperature.

Surprisingly, it has been found that smectic liquid-crystal mixtures which have a combination of alkoxyphenylpyrimidines, meta-substituted six-membered aromatic compounds and certain mesogenic compounds having only one wing group have a particularly favorable property profile for use in LC phases.

The invention relates to a smectic liquid-crystal mixture comprising
A. at least one compound of the formula (I)

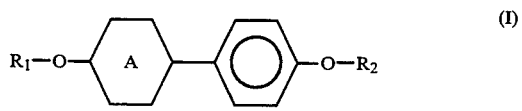

in which
$R_1$ and $R_2$ are identical or different, straight-chain or branched alkyl groups having 1 to 18 or 3 to 18 carbon atoms respectively, where a $CH_2$ group adjacent to the oxygen may be replaced by —CO—,

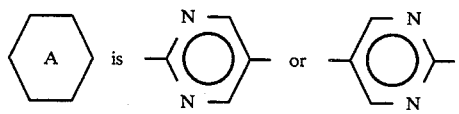

and/or at least one compound of the formula (II),

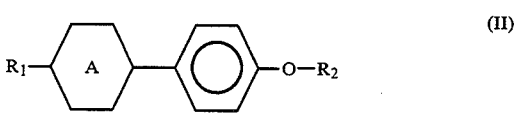

in which
$R_1$ and $R_2$ are identical or different, branched or unbranched alkyl groups having 1 to 18 or 3 to 18 carbon atoms respectively, where a $CH_2$ group adjacent to the oxygen may also be replaced by —CO—, and ⟨A⟩ is —⟨N=N⟩— or —⟨N·····N⟩—;

B. at least one compound of the formula (III)

$$R^1(-A^1)_a(-M^1)_b(-A^2)_c(-M^2)_d(-A^3)_e(-M^3)_f(-A^4)-H \qquad (III)$$

in which

R$^1$ is a straight-chain or branched alkyl radical having 1 to 22 or 3 to 22 carbon atoms respectively, where one or two non-adjacent CH$_2$ groups may also be replaced by —O—, —CO—, —CO—O—, —O—CO—, —O—CO—O— or —Si(CH$_3$)$_2$—, A$^1$, A$^2$, A$^3$ and A$^4$ are identical or different and are 1,4-phenylene, in which one or two H atoms may be replaced by F or CN, pyridine-2,5-diyl, in which one or two H atoms may be replaced by F, pyrimidine-2,5-diyl, in which one or two H atoms may be replaced by F, trans-1,4-cyclohexylene, 1,3,4-thiadiazole-2,5-diyl or naphthalene-2,6-diyl, M$^1$, M$^2$ and M$^3$ are identical or different and are —CO—O—, —O—CO—, —CH$_2$—O—, —O—CH$_2$— or -CH$_2$—CH$_2$—, and a, b, c, d, e and f are zero or one, with the proviso that the sum a+c+e is 0, 1, 2 or 3;

C. and at least one compound of the formula (IV)

$$R^1(-A^1)_a(-M^1)_b(-A^2)_c(-M^2)_d(-A^3)_e(-M^3)_f-\underset{X^4=X^3}{\overset{X^1}{\underset{\|}{\bigg\langle}}}\overset{R^{2(IV)}}{\underset{X^2}{\bigg\rangle}}$$

in which

R$^1$ and R$^2$ are identical or different, straight-chain or branched alkyl radicals having 1 to 22 or 3 to 22 carbon atoms respectively, where one or two non-adjacent —CH$_2$— groups may be replaced by —O—, —CO—, —CO—O—, —O—CO—, —O—CO—O— or —Si (CH$_3$)$_2$—, A$^1$, A$^2$ and A$^3$ are identical or different and are 1,4-phenylene, in which one or two H atoms may be replaced by F, pyridine-2,5-diyl, in which one or two H atoms may be replaced by F, pyrimidine-2,5-diyl, in which one or two H atoms may be replaced by F, trans-1,4-cyclohexylene, in which one or two H atoms may be replaced by —CN and/or —CH$_3$, or 1,3,4-thiadiazole-2,5-diyl, and A$^1$ is alternatively $$\underset{X^5=X^6}{\overset{X^8}{\underset{\|}{\bigg\langle}}}\overset{}{\underset{X^7}{\bigg\rangle}}$$

M$^1$, M$^2$ and M$^3$ are identical or different and are —O—, —CO—O—, —O—CO—, —CH$_2$—O—, —O—CH$_2$— or —CH$_2$—CH$_2$—, X$^1$, X$^2$, X$^3$, X$^4$, X$^5$, X$^6$, X$^7$ and X$^8$ are CH or N, where the number of N atoms in a six-membered ring is 0, 1 or 2, and a, b, c, d, e and f are zero or one, with the proviso that the sum a+c+e is 0, 1, 2 or 3.

The liquid-crystal mixtures according to the invention have low melting points, broad S$_C$ phases and a high S$_C$/S$_A$ phase transition. Ferroelectric liquid crystal mixtures according to the invention have good alignment, a large margin, low flicker and a large angle in the chevron geometry.

DESCRIPTION OF THE PREFERRED EMBODIMENTS

Preference is given as component A to compounds of the formula (I) and/or (II) in which R$^1$ and R$^2$ are identical or different, straight-chain or branched alkyl groups having 1 to 12 or 3 to 12 carbon atoms respectively, where a CH$_2$ group adjacent to the oxygen may also be replaced by —CO—, and ⟨A⟩ is —⟨N=N⟩—.

Preference is given as component B to compounds of the formula (III) in which

R$^1$ is a straight-chain alkyl radical having 1 to 14 carbon atoms, where one or two non-adjacent CH$_2$ groups may also be replaced by —O—, —CO—O—, —O—CO—, —O—CO—O— or —Si(CH$_3$)$_2$—, and A$^1$, A$^2$, A$^3$ and A$^4$ are identical or different and are 1,4-phenylene, pyrimidine-2,5-diyl, in which one or two H atoms may also be replaced by F, trans-1,4-cyclohexylene or 1,3,4-thiadiazole-2,5-diyl.

Preference is given as component C to compounds of the formula (IV) in which

R$^1$ and R$^2$ are identical or different, straight-chain alkyl radicals having 1 to 14 carbon atoms, where one or two non-adjacent CH$_2$ groups may also be replaced by —O—, —CO—, —CO—O—, —O—CO—, —O—CO—O— or —Si(CH$_3$)$_2$—, and A$^1$, A$^2$ and A$^3$ are identical or different and are 1,4-phenylene, pyrimidine-2,5-diyl, in which one or two H atoms may also be replaced by F, trans-1,4-cyclohexylene or 1,3,4-thiadiazole-2,5-diyl.

In addition to components A, B and C, the LC mixtures according to the invention preferably contain one or more compounds from groups D to G:

D. Silicon compounds of the formula (V)

$$R^1(-A^1)_j(-M^1)_k(-A^2)_l(-M^2)_m(-A^3)_n-R^2 \qquad (V)$$

in which

R$^1$ is straight-chain or branched alkyl having 1 to 22 or 3 to 22 carbon atoms respectively, where one or two non-adjacent CH$_2$ groups may also be replaced by —O—, —CO—, —CO—O—, —O—CO— or —O—CO—O—, R$^2$ is straight-chain or branched alkyl having 1 to 22 or 3 to 22 carbon atoms respectively, where one or two non-adjacent —CH$_2$— groups may also be replaced by —O—, —CO—, —CO—O—, —O—CO— or —O—CO—O—, with the proviso that one CH₂ group not bonded to oxygen has been replaced by —Si(CH₃)₂—, $A^1$, $A^2$ and $A^3$ are identical or different and are 1,4-phenylene, in which one or two H atoms may be replaced by F, trans-1,4-cyclohexylene, pyridine-2,5-diyl, in which one or two H atoms may be replaced by F, pyrimidine-2,5-diyl, in which one or two H atoms may be replaced by F, or 1,3,4-thiadiazole-2,5-diyl, $M^1$ and $M^2$ are identical or different and are —CO—O—, —O—CO—, —CH₂—O— or —O—CH₂—, and i, k, l, m and n are zero or 1, with the proviso that i+1+n=2 or 3.

Preferred compounds from group D are those of the formula (v) in which $R^1$ is a straight-chain or branched alkyl group having 1 to 12 or 3 to 12 carbon atoms respectively, where one or two non-adjacent CH₂ groups may also be replaced by —O—, —CO—O— or —O—CO—, and $R^2$ is a straight-chain or branched alkyl group having 1 to 12 or 3 to 12 carbon atoms respectively, where one or two non-adjacent CH₂ groups may also be replaced by —O—, —CO—O— or —O—CO—, and in which one CH₂ group not bonded to oxygen has been replaced by —Si(CH₃)₂—.

E. Hydroquinone derivatives of the formula (VI)

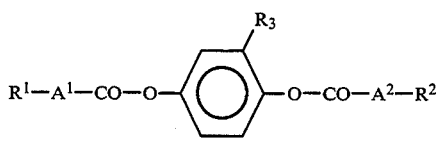

in which $R^1$ and $R^2$ are identical or different, straight-chain or branched alkyl radicals having 1 or 3 to 16, preferably 1 or 3 to 10 carbon atoms respectively, where one or two non-adjacent —CH₂— groups may also be replaced by —O—, —CO—, —O—CO—, —CO—O— or —O—CO—O—, preferably —O—, —O—CO— or —CO—O—, $R^3$ is —CH₃, CF₃ or —C₂H₅, preferably —CH₃ or CF₃, $A^1$ and $A^2$ are identical or different and are

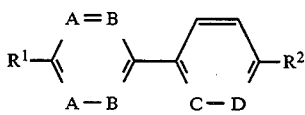

F. Pyridylpyrimidines of the formula (VII)

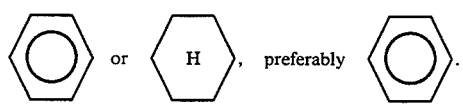

in which

A is N and B is CH or A is CH and B is N, C is N and D is CH or C is CH and D is N, where one or two CH groups may be replaced by CF groups, and $R^1$ and $R^2$ are identical or different, straight-chain or branched alkyl radicals having 1 to 22 or 3 to 22 carbon atoms respectively, where one or two non-adjacent —CH₂— groups may also be replaced by —O—, —CO—, —CO—O—, —O—CO— or —O—CO—O—.

Preference is given to compounds of the formula (VII) in which $R^1$ and $R^2$ are identical or different, straight-chain or branched alkyl groups having 1 to 14 or 3 to 14 carbon atoms respectively, where one or two non-adjacent —CH₂— groups may also be replaced by —O—, —CO—, —CO—O—, —O—CO— or —O—CO—O—.

G. Phenylbenzoates of the formula (VIII)

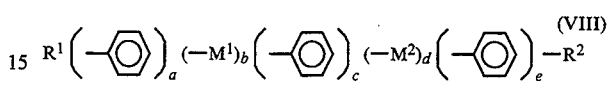

in which $R^1$ and $R^2$ are identical or different, straight-chain or branched alkyl radicals having 1 to 22 or 3 to 22 carbon atoms respectively, where one or two non-adjacent —CH₂— groups may also be replaced by —O—, —CO—, —CO—O—, —O—CO— or —O—CO—O—, $M^1$ and $M^2$ are identical or different and are —CO—O— or —O—CO—, and a, b, c, d and e are zero or one, with the proviso that a+c+e=2 or 3 and b+d=1 or 2.

Preference is given to the compounds of the formula (VIII) where $R^1$ and $R^2$ are straight-chain alkyl radicals having 1 to 14 carbon atoms, where one or two non-adjacent —CH₂— groups may also be replaced by —O—, —CO—, —CO—O—, —O—CO— or —O—CO—O—.

Compounds from the groups A, B, C and, if desired, D to G are used to prepare achiral or racemic base mixtures. Ferroelectric mixtures according to the invention additionally contain optically active dopes.

Such mixtures preferably contain at least two optically active compounds from groups H to K:

H. Optically active phenylbenzoates of the formula (IX)

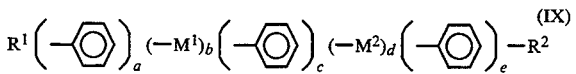

in which $R^1$ and $R^2$ are identical or different, straight-chain or branched alkyl radicals having 1 to 22 or 3 to 22 carbon atoms respectively, where one or two non-adjacent —CH₂— groups may also be replaced by —O—, —CO—, —CO—O—, —O—CO— or —O—CO—, and in which at least one of the radicals $R^1$ and $R^2$ is a branched, optically active alkyl group, $M^1$ and $M^2$ are identical or different and are —CO—O—, —O—CO— or a single bond, and a, b, c, d and e are zero or one, with the proviso that the sum a+c+e is 2 or 3 and b+d is 1 or 2.

Preference is given to compounds of formula (IX where $R^1$ and $R^2$ are identical or different, straight-chain or branched alkyl radicals having 1 to 16 or 3 to 16 carbon atoms respectively, where one or two non-adjacent —CH₂— groups may also be replaced by —O—, —CO—O— or —O—CO—, and in which at least one of the radicals $R^1$ and $R^2$ is a branched, optically active alkyl group.

I. Optically active oxirane ethers of the formula (X)

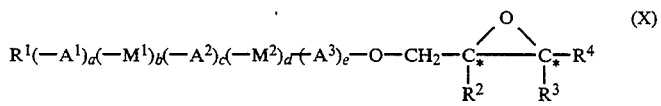

in which the symbols and indices have the following meanings:
* is a chiral center,
$R^1$ is a straight-chain or branched alkyl radical having 1 to 22 or 3 to 22 carbon atoms respectively, where one or two non-adjacent —CH$_2$— groups may also be replaced by —O—, —CO—, —CO—O—, —O—CO—, —O—CO—O— or —Si(CH$_3$)$_2$—, or the following optically active group:

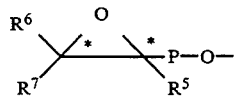

$R^2$, $R^3$, $R^4$, $R^5$, $R^6$ and $R^7$ are identical or different and are H or a straight-chain or branched alkyl radical having 1 to 16 carbon atoms,
P is —CH$_2$— or —CO—,
$A^1$, $A^2$ and $A^3$ are identical or different and are 1,4-phenylene, in which one or two H atoms may be replaced by F, pyridine-2,5-diyl, in which one or two H atoms may each be replaced by F, pyrimidine-2,5-diyl, in which one or two H atoms may be replaced by F, trans-1,4-cyclohexylene, in which one or two H atoms may be replaced by —CN and/or —CH$_3$, or 1,3,4-thiadiazole-2,5-diyl,
$M^1$ and $M^2$ are identical or different and are —CO—O—, —O—CO—, —CH$_2$—O—, —O—CH$_2$— or —CH$_2$—CH$_2$—, and
a, b, c, d and e are zero or 1.

The asymmetrical carbon atoms of the oxirane ring or of the oxirane rings can, independently of one another, have the R or S configuration.

Preference is given to compounds of the formula (X) where
$R^1$ is a straight-chain alkyl radical having 1 to 14 carbon atoms, where one or two non-adjacent —CH$_2$— groups may also be replaced by —O—, —CO—O—, —O—CO— or —Si(CH$_3$)$_2$—, or the following optically active group:

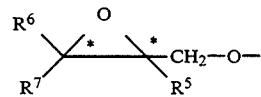

where
$R^2 = R^5$, $R^3 = R^6$ and $R^4 = R^7$ are identical or different and are H or a straight-chain or branched alkyl radical having 1 to 6 carbon atoms, and
$A^1$, $A^2$ and $A^3$ are identical or different and are 1,4-phenylene, pyrimidine-2,5-diyl, in which one or two H atoms may be replaced by F, trans-1,4-cyclohexylene or 1,3,4-thiadiazole-2,5-diyl.

J. Optically active oxirane esters of the formula (XI)

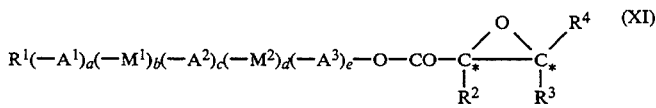

where the symbols and indices have the following meanings:
* is a chiral center,
$R^1$ is a straight-chain or branched alkyl radical having 1 to 22 or 3 to 22 carbon atoms respectively, where one or two non-adjacent —CH$_2$— groups may also be replaced by —O—, —CO—, —CO—O—, —O—CO—, —O—CO—O— or —Si(CH$_3$)$_2$—,
$R^2$, $R^3$ and $R^4$ are identical or different and are H or a straight-chain or branched alkyl radical having 1 to 16 carbon atoms,
$A^1$, $A^2$ and $A^3$ are identical or different and are 1,4-phenylene, in which one or two H atoms may be replaced by F, pyridine-2,5-diyl, in which one or two H atoms may each be replaced by F, pyrimidine-2,5-diyl, in which one or two H atoms may be replaced by F, trans-1,4-cyclohexylene, in which one or two H atoms may be replaced by —CN and/or —CH$_3$, or 1,3,4-thiadiazole-2,5-diyl,
$M^1$ and $M^2$ are identical or different and are —CO—O—, —O—CO—, —CH$_2$—O—, —O—CH$_2$— or —CH$_2$—CH$_2$—,
a, b, c, d and e are zero or one.

The asymmetrical carbon atoms of the oxirane ring can, independently of one another, have the R or S configuration.

Preference is given to compounds of the formula (XI) where
$R^1$ is a straight-chain alkyl radical having 1 to 14 carbon atoms, where one or two non-adjacent —CH$_2$— groups may also be replaced by —O—, —CO—, —CO—O—, —O—CO—, —O—CO—O— or —Si(CH$_3$)$_2$—,
$R^2$, $R^3$ and $R^4$ are identical or different and are H or a straight-chain or branched alkyl radical having 1 to 6 or 3 to 6 carbon atoms respectively,
$A^1$, $A^2$ and $A^3$ are identical or different and are 1,4-phenylene, pyrimidine-2,5-diyl, where one or two H atoms may be replaced by F, trans-1,4-cyclohexylene or 1,3,4-thiadiazole-2,5-diyl.

K. Optically active dioxolane ethers of the formula (XII)

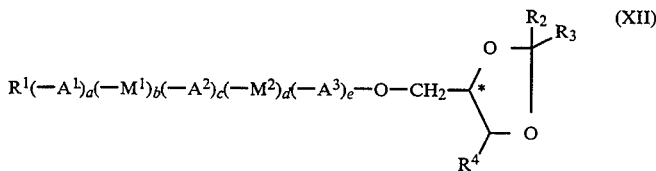

where the symbols and indices have the following meanings:
* is a chiral center,
$R^1$ is a straight-chain or branched alkyl radical having 1 to 22 or 3 to 22 carbon atoms respectively, where one or two non-adjacent —$CH_2$— groups may also be replaced by —O—, —CO—, —CO—O—, —O—CO—, —O—CO—O— or —Si($CH_3$)$_2$—,
$R^2$, $R^3$ and $R^4$ are identical or different and are H, a straight-chain or branched alkyl radical having 1 to 16 or 3 to 10 carbon atoms respectively or an alkenyl radical having 2 to 16 carbon atoms, where $R^2$ and $R^3$ together may alternatively be —($CH_2$)$_5$—,
$A^1$, $A^2$ and $A^3$ are identical or different and are 1,4-phenylene, in which one or two H atoms may be replaced by F, pyridine-2,5-diyl, in which one or two H atoms may be replaced by F, pyrimidine-2,5-diyl, in which one or two H atoms may be replaced by F, trans-1,4-cyclohexylene, in which one or two H atoms may be replaced by —CN and/or —$CH_3$, or 1,3,4-thiadiazole-2,5-diyl,
$M^1$ and $M^2$ are identical or different and are —CO—O—, —O—CO—, —$CH_2$—O—, —O—$CH_2$— or —$CH_2$—$CH_2$—, and
a, b, c, d and e are zero or one.

Asymmetrical carbon atoms of the dioxolane ring can, independently of one another, have the R or S configuration.

Preference is given to compounds of the formula (XII) where
$R^1$ is a straight-chain alkyl radical having 1 to 14 carbon atoms, where one or two non-adjacent —$CH_2$— groups may also be replaced by —O—, —CO—, —CO—O—, —O—CO—, —O—CO—O— or —Si($CH_3$)$_2$—,
$R^2$ and $R^3$ are $CH_3$ or together are —($CH_2$)$_5$—,
$R^4$ is H, and
$A^1$, $A^2$ and $A^3$ are identical or different and are 1,4-phenylene, pyrimidine-2,5-diyl, where one or two H atoms may be replaced by F, trans-1,4-cyclohexylene or 1,3,4-thiadiazole-2,5-diyl.

L. Optically active dioxolane esters of the formula (XIII)

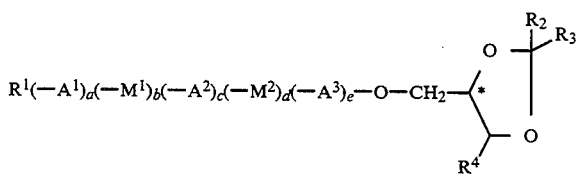

in which
$R^1$ is a straight-chain or branched alkyl radical having 1 to 16 or 3 to 16 carbon atoms respectively, where one or more non-adjacent —$CH_2$— groups may also be replaced by —O—, —CO—, —O—CO— or —CO—O—,
$R^2$, $R^3$ and $R^4$ are identical or different and are H, an alkyl radical or an alkenyl radical having 1 to 10 or 2 to 10 carbon atoms respectively, where $R^2$ and $R^3$ together may alternatively be —($CH_2$)$_5$—,
$A^1$, $A^2$ and $A^3$ are identical or different and are 1,4-phenylene, in which one or two H atoms may be replaced by F, pyridine-2,5-diyl, in which one or two H atoms may be replaced by F, pyrimidine-2,5-diyl, in which one or two H atoms may be replaced by F, trans-1,4-cyclohexylene, in which one or two H atoms may be replaced by —CN and/or —$CH_3$, or 1,3,4-thiadiazole-2,5-diyl,
$M^1$ and $M^2$ are identical or different and are —CO—O—, —O—CO—, —$CH_2$—O—, —O—$CH_2$— or —$CH_2$—$CH_2$—, and
a, b, c, d and e are zero or one.

Asymmetrical carbon atoms of the dioxolane ring can, independently of one another, have the R or S configuration.

Preference is given to compounds of the formula (XIII) where
$R^1$ is a straight-chain alkyl radical having 1 to 14 carbon atoms, where one or two non-adjacent —$CH_2$— groups may also be replaced by —O—, —CO—O—, —O—CO— or —Si($CH_3$)$_2$—,
$R^2$ and $R^3$ are $CH_3$ or together are —($CH_2$)$_5$—,
$R^4$ is H, and
$A^1$, $A^2$ and $A^3$ are identical or different and are 1,4-phenylene, pyrimidine-2,5-diyl, where one or two H atoms may be replaced by F, trans-1,4-cyclohexylene or 1,3,4-thiadiazole-2,5-diyl.

M. Macrocyclic compounds of the formula (XIV)

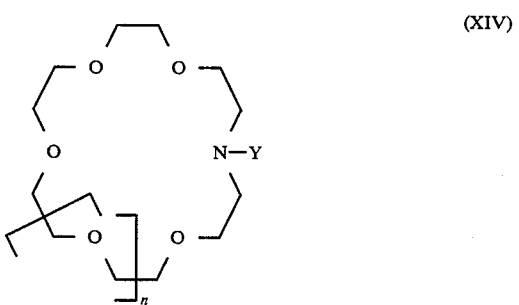

where
n is 0 or 1, and
y is —CO—(t-butyl) or —CO—(adamantyl).

It has been found that the FLC mixtures according to the invention satisfy the abovementioned requirements of FLC mixtures particularly well, in particular have high $S_C^*/S_A$ phase-transition temperatures and a very low melting point. The mixtures are furthermore distinguished by short response times, a particularly large margin and very good alignability. These mixtures can not only be operated very well in the chevron geometry, but are also suitable for field treatment (i.e. for operation in the quasi-bookshelf geometry, QBG).

Preference is given to achiral base mixtures according to the invention which contain at least one of components D to G in addition to components A, B and C. Particular preference is given to mixtures of this type which contain from 3 to 4 of components D to G, very particularly preferably 4 of components D to G, in addition to components A, B and C.

Particular preference is given to the component combinations:
aa) A+B+C+E
ab) A+B+C+D+E
ac) A+B+C+D+E+F
ad) A+B+C+D+E+F+G Ferroelectric mixtures according to the invention contain at least two compounds from groups H to L in addition to one of the abovementioned base mixtures.

Such mixtures preferably contain component M in addition to at least one of components H to L.

Particular preference is given to mixtures which contain two or more, very particularly preferably three or more, of components I to L in addition to component M.

Particular preference is given to the combinations.
ba) M+I+J
bb) M+I+J+K
bc) M+I+J+L
bd) M+I+J+K+L
be) M+I+J+K+L+H The mixtures according to the invention preferably contain the following amounts by weight of the stated components:

[The percentages are in each case percent by weight, based on the weight of the entire mixture]
A: 5 to 80%, preferably 10 to 70%, in particular 15 to 60%;
B: 1 to 40%, preferably 5 to 30%, in particular 10 to 20%;
C: 1 to 25%, preferably 2 to 20%, in particular 5 to 15%;
D: 0 to 40%, preferably 1 to 30%, in particular 12 to 20%;
E: 0 to 15%, preferably 0 to 10%, in particular 1 to 5%;
F: 0 to 20%, preferably 1 to 15%, in particular 2 to 10%;
G: 0 to 30%, preferably 1 to 25%, in particular 5 to 20%;
H: 0 to 15%, preferably 0 to 10%, in particular 0 to 5%;
I: 0 to 20%, preferably 0.1 to 15%, in particular 1 to 10%;
J: 0 to 20%, preferably 0.1 to 15%, in particular 1 to 10%;
K: 0 to 10%, preferably 0 to 5%, in particular 0.5 to 3%;
L: 0 to 15%, preferably 0.5 to 10%, in particular 1 to 5%;
M: 0 to 10%, preferably 0.1 to 5%, in particular 0.5 to 2.5%.

The mixtures according to the invention preferably contain from 3 to 30 (ferroelectric mixtures from 5 to 30), particularly preferably from 5 to 25, very particularly preferably from 7 to 22, in particular from 10 to 20, individual compounds.

Preferred components are the following:

4 to 8 individual compounds, particularly preferably 5 to 6 individual compounds;
B: 1 to 4 individual compounds, particularly preferably 1 or 2 individual compounds;
C: 1 to 3 individual compounds, particularly preferably 1 individual compound;
D: 0 to 5 individual compounds, particularly preferably 1 to 3 individual compounds;
E: 0 to 3 individual compounds, particularly preferably 0 or 1 individual compound;
F: 0 to 3 individual compounds, particularly preferably 1 or 2 individual compounds;
G: 0 to 3 individual compounds, particularly preferably 1 or 2 individual compounds;
H: 0 to 3 individual compounds, particularly preferably 0 or 1 individual compound;
I: 0 to 4 individual compounds, particularly preferably 1 or 2 individual compounds;
J: 0 to 4 individual compounds, particularly preferably 1 or 2 individual compounds;
K: 0 to 3 individual compounds, particularly preferably 0 or 1 individual compound;
L: 0 to 3 individual compounds, particularly preferably 0 or 1 individual compound;
M: 0 to 3 individual compounds, particularly preferably 1 individual compound.

In addition to components A to M, the mixtures according to the invention may contain further constituents, for example auxiliaries, such as viscosity reducers.

The individual components of the mixtures according to the invention are known per se. They are described, along with their preparation, in, for example:
A: WO-A 86/06401
B: EP-A 0 541 081
C: EP-A 0 578 054
D: EP-A 0 355 008
E: DE-A 4 243 705
F: WO-A 92/12974
G: Keller et al., Ferroelectrics 58 (1984) 3
H: Keller et al., Ferroelectrics 58 (1984) 3
I: EP-A 0 263 437 ($\triangleq$ U.S. Pat. No. 4,876,028), DE-A 4 143 139
J: EP-A 0292 954 ($\triangleq$ U.S. Pat. No. 4,988,459)
K: EP-A 0 351 746
L: EP-A 0 361 272
M: EP-A 0 528 415.

In order to prepare the mixtures according to the invention, the individual substances are, for example, stirred together in the isotropic phase and freed from particles and suspended material via suitable filters.

The mixtures according to the invention are suitable for use in all areas of optical technology, for example in switching and display elements (displays), light valves and components having NLO properties. The mixtures according to the invention are particularly suitable for use where the properties of smectic liquid crystals are utilized.

However, since the mixtures generally also form nematic phases, use in the area of nematics technology is in principle also possible. Achiral base mixtures can be used in all areas in which anisotropic fluids are employed, for example as column materials for gas chromatography.

Ferroelectric mixtures according to the invention are preferably used in the FLC cells described in detail in the introduction, which are based on the utilization of the SSFLC effect (see, for example, J. W. Goodby et al., Ferroelectric Liquid Crystals, pp. 24 ff., Gordon & Breach, Philadelphia, 1991).

In these cells, the compounds according to the invention are preferably employed in combinations with alignment layers, as proposed, for example, in DE-A 42 12 893 or in the German Patent Application with the title "Cyclische Strukturelemente enthaltende Silan-Koppler als Orientierungsschichten" [Silane couplers containing cyclic structural elements as alignment layers], where an alignment film for liquid crystals is described which comprises a quasi-monomolecular layer of compounds of the formula $$C_y\text{-}S_p\text{-}A_n$$

in which
$C_y$ is a mediocyclic or macrocyclic carbon ring having 8 or more ring members, where this ring may also contain fused benzene rings and —O—, —N—, —S—, —Si— and —B— as hetero atoms;
$S_p$ is an alkyl group having 1 to 20 carbon atoms in which one or more non-adjacent —$CH_2$— groups may be replaced by —O—, —S—, —CO—, —O—CO—, —NH—CO—, —O—COO—, —NH—CO—NH—, —NH—CO—O—, —$SO_2$—, —Si($CH_3$)$_2$—, —CH=CH— or —C≡C—,
$A_n$ is $SiX^1X^2X^3$, where
$X^1$ is a single bond and
$X^2$ and $X^3$ are identical or different and are a single bond, an alkyl group or an alkoxy group,
where the compounds are bonded to an oxygen-containing layer via the single bond(s) of group $A_n$.

The mixtures are furthermore suitable for field treatment, i.e. for operation in the quasi-bookshelf geometry (QBG) (see, for example, H. Rieger et al., SID 91 Digest (Anaheim), 1991, p. 396).

The mixtures according to the invention are likewise suitable for use in ferroelectric liquid-crystal displays which are based on utilization of the DHF effect or the PSFLCD effect (pitch stabilized ferroelectric liquid crystal display, also known as SBF, short pitch bistable ferroelectric effect). The DHF effect is described, for example, by B. I. Ostrovski in Advances in Liquid Crystal Research and Applications, Oxford/Budapest, 1980, pp. 469 ff., and the PSFLCD effect is described, for example, in DE-A 3 920 625 and EP-A 0 405 346. Utilization of this effect requires, in contrast to the SSFLC effect, a liquid-crystalline material having a short $S_c$ pitch.

The invention is described in greater detail by the examples:

EXAMPLES

In order to determine the electro-optical properties of the mixtures, self-made 1-pixel test cells having alignment layers as described above are used. The thickness of the liquid crystal varies between 1.5 and 2 μm. The cells are filled by means of capillary forces in the isotropic phase with or without vacuum. The CPA measurements are carried out using the electrical addressing scheme shown in SPIE 1665, Liquid Crystal Materials, Devices and Applications (1992) with a bias B=4:1. The margin measurements are carried out using the addressing scheme shown in the same citation with a bias B=4:1, where the percentage margin given relates to the threshold voltage measured using the same scheme.

EXAMPLE 1:

A mixture consisting of:

| Structure | Proportions by weight |
|---|---|
|  $C_7H_{15}$—O—[pyrazine]—[phenyl]—O—$C_9H_{19}$ | 6.37% |
| 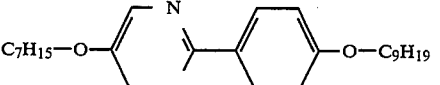 $C_6H_{13}$—O—[pyrazine]—[phenyl]—O—$C_8H_{17}$ | 7.19% |
| 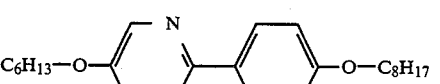 $C_8H_{17}$—O—[pyrazine]—[phenyl]—O—$C_{10}H_{21}$ | 6.94% |
| 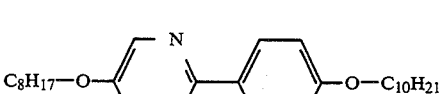 $C_6H_{13}$—O—[pyrazine]—[phenyl]—O—$C_6H_{13}$ | 4.99% |
| 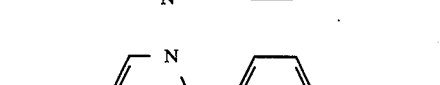 $C_8H_{17}$—O—[pyrazine]—[phenyl]—O—$C_6H_{13}$ | 7.19% |

-continued
| Structure | Proportions by weight |
|---|---|
| 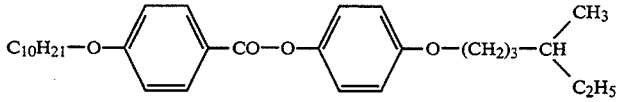 | 7.66% |
| 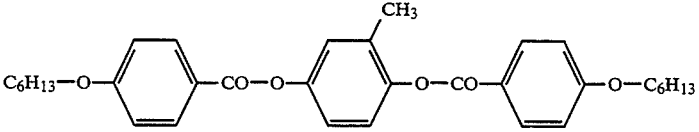 | 2.47% |
| 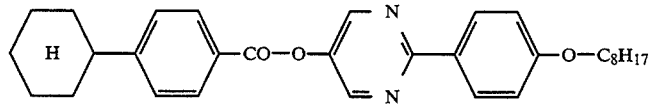 | 5.67% |
| 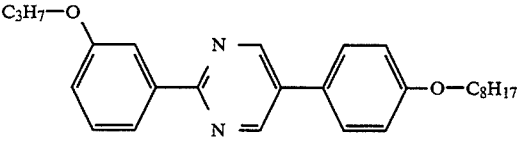 | 7.83% |
| 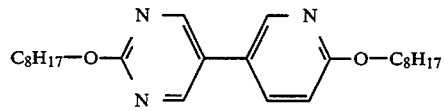 | 4.82% |
| 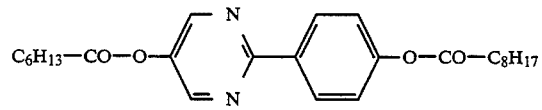 | 6.17% |
| 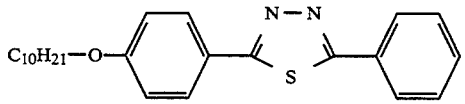 | 6.45% |
| 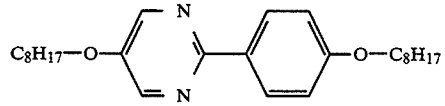 | 7.71% |
| 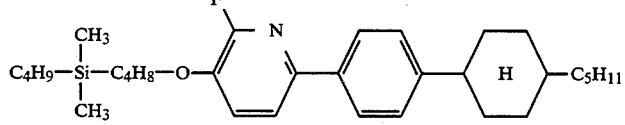 | 4.86% |
| 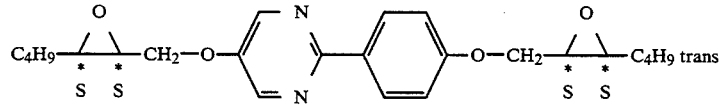 | 4.90% |
| 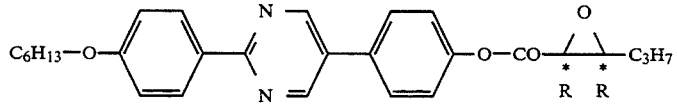 | 6.56% |

-continued
| | Proportions by weight |
|---|---|
| 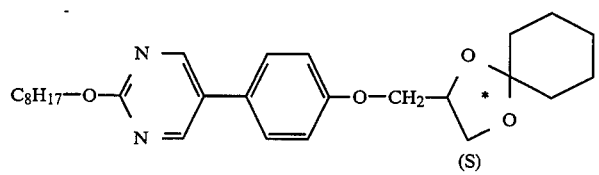 | 1.62% |
| 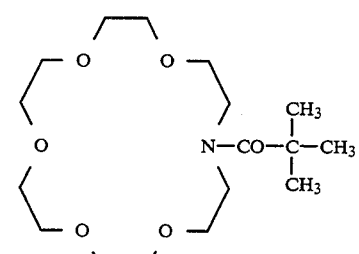 | 0.58% |
has the following liquid-crystalline phase ranges:
X - 20 S*$_c$ 70 S$_A$ 86 N* 92 I.
The spontaneous polarization at 25° C. is 47 nC/cm², the critical pulse area in the chevron geometry is 470 Vs/m. The mixture switches in multiplex operation with a 54% margin and has a contrast ratio of 20:1.
EXAMPLE 2
A mixture consisting of:
| | Proportions by weight |
|---|---|
| 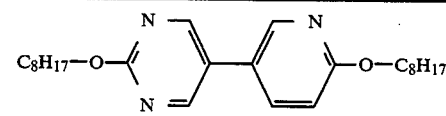 | 4.24 |
| 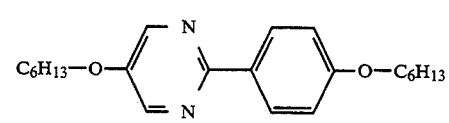 | 3.71 |
| 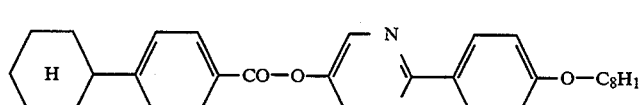 | 6.21 |
| 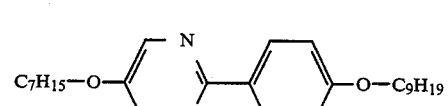 | 6.83 |
| 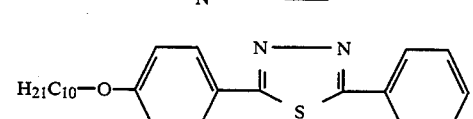 | 7.09 |
| 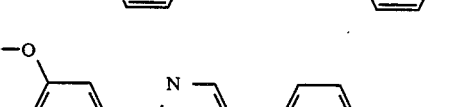 | 8.75 |
| 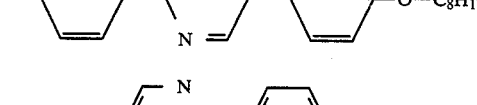 | 7.03 |

-continued

| Structure | Proportions by weight |
|---|---|
| 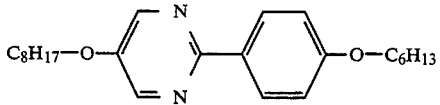 C8H17—O—[pyrimidine]—[phenyl]—O—C6H13 | 7.72 |
| 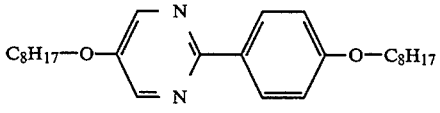 C8H17—O—[pyrimidine]—[phenyl]—O—C8H17 | 8.30 |
| 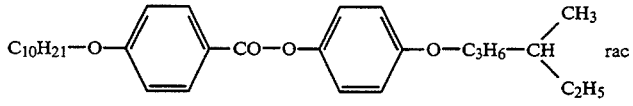 C10H21—O—[phenyl]—CO—O—[phenyl]—O—C3H6—CH(CH3)—C2H5 rac | 9.62 |
| 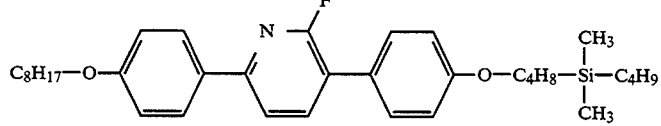 C8H17—O—[phenyl]—[fluoropyridine]—[phenyl]—O—C4H8—Si(CH3)2—C4H9 | 8.67 |
| 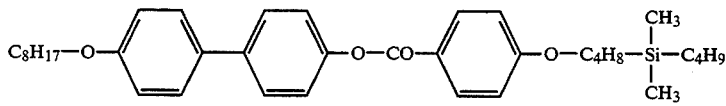 C8H17—O—[phenyl]—[phenyl]—O—CO—[phenyl]—O—C4H8—Si(CH3)2—C4H9 | 6.14 |
| 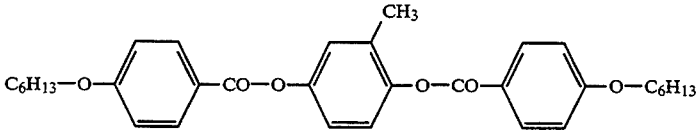 C6H13—O—[phenyl]—CO—O—[methylphenyl]—O—CO—[phenyl]—O—C6H13 | 2.72 |
| 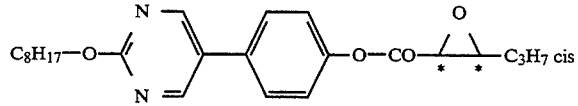 C8H17—O—[pyrimidine]—[phenyl]—O—CO—[epoxide]—C3H7 cis | 2.41 |
| 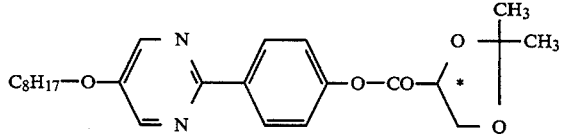 C8H17—O—[pyrimidine]—[phenyl]—O—CO—CH—C(CH3)2—O (dioxolane) | 2.34 |
| 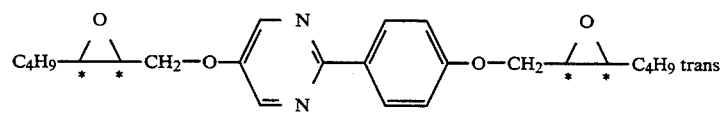 C4H9—[epoxide]—CH2—O—[pyrimidine]—[phenyl]—O—CH2—[epoxide]—C4H9 trans | 4.89 |
| 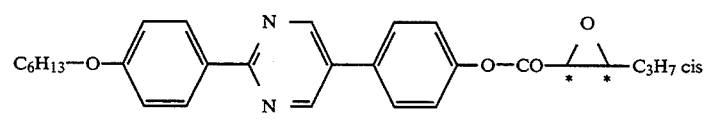 C6H13—O—[phenyl]—[pyrimidine]—[phenyl]—O—CO—[epoxide]—C3H7 cis | 2.55 |

| | Proportions by weight |
|---|---|
| [structure: crown ether with N−C(=O)−C(CH₃)₃ substituent] | 0.78 | has the following liquid-crystalline phase ranges:

X - 38 S*$_C$ 70 S$_A$ 88 N* 96 I.

The spontaneous polarization at 25° C. is 38 nC/cm², and the critical pulse area in the chevron geometry is 730 Vs/m. The mixture switches in multiplex operation with a 73% margin, has an effective switch angle 2 $\theta_{eff}$ of 26° and has a contrast ratio of 21:1.

EXAMPLE 3

A mixture consisting of:

| | Proportions by weight |
|---|---|
| $C_8H_{17}$−O−[pyrimidine]−[pyridine]−O−$C_8H_{17}$ | 3.98 |
| $C_6H_{13}$−O−[pyrimidine]−[phenyl]−O−$C_6H_{13}$ | 3.49 |
| [cyclohexyl]−[phenyl]−CO−O−[pyrimidine]−[phenyl]−O−$C_8H_{17}$ | 5.84 |
| $C_7H_{15}$−O−[pyrimidine]−[phenyl]−O−$C_9H_{19}$ | 6.42 |
| $H_{21}C_{10}$−O−[phenyl]−[thiadiazole]−[phenyl] | 6.66 |
| $C_3H_7$−O−[phenyl]−[pyrimidine]−[phenyl]−O−$C_8H_{17}$ | 8.22 |
| $C_6H_{13}$−O−[pyrimidine]−[phenyl]−O−$C_8H_{17}$ | 6.61 |
| $C_8H_{17}$−O−[pyrimidine]−[phenyl]−O−$C_6H_{13}$ | 7.25 |

|  | Proportions by weight |
|---|---|
| 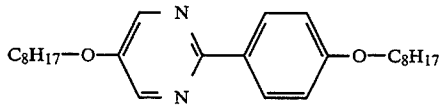 C₈H₁₇—O—[pyrimidine]—[phenyl]—O—C₈H₁₇ | 7.80 |
| 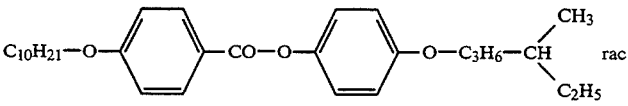 C₁₀H₂₁—O—[phenyl]—CO—O—[phenyl]—O—C₃H₆—CH(CH₃)(C₂H₅) rac | 9.04 |
| 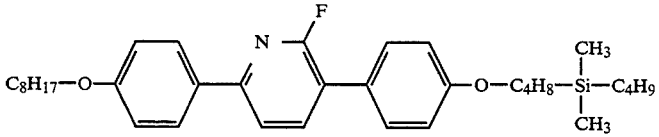 C₈H₁₇—O—[phenyl]—[F-pyridine]—[phenyl]—O—C₄H₈—Si(CH₃)₂—C₄H₉ | 8.15 |
| 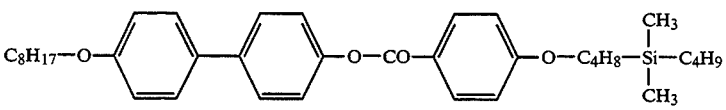 C₈H₁₇—O—[phenyl]—[phenyl]—O—CO—[phenyl]—O—C₄H₈—Si(CH₃)₂—C₄H₉ | 5.77 |
| 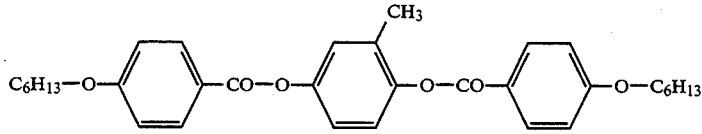 C₆H₁₃—O—[phenyl]—CO—O—[CH₃-phenyl]—O—CO—[phenyl]—O—C₆H₁₃ | 2.56 |
| 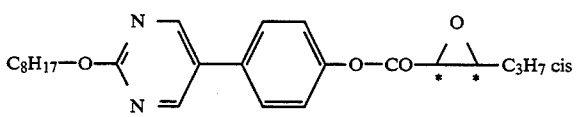 C₈H₁₇—O—[pyrimidine]—[phenyl]—O—CO—[epoxide]—C₃H₇ cis | 3.45 |
| 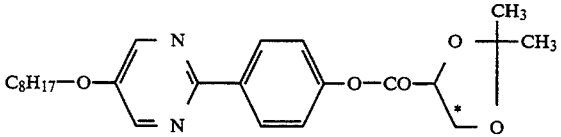 C₈H₁₇—O—[pyrimidine]—[phenyl]—O—CO—[CH(O-C(CH₃)₂)] | 3.35 |
| 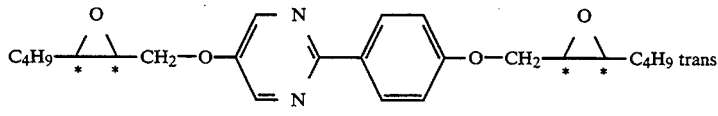 C₄H₉—[epoxide]—CH₂—O—[pyrimidine]—[phenyl]—O—CH₂—[epoxide]—C₄H₉ trans | 6.98 |
| 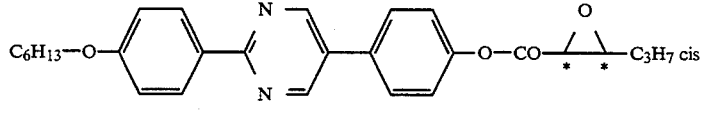 C₆H₁₃—O—[phenyl]—[pyrimidine]—[phenyl]—O—CO—[epoxide]—C₃H₇ cis | 3.65 |
| 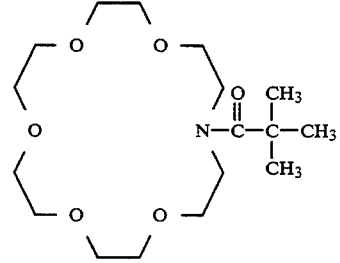 [crown ether]—N—C(O)—C(CH₃)₃ | 0.78 | has the following liquid-crystalline phase ranges:

X - 28 $S^*_C$ 73 $S_A$ 88 N* 96 I.

The spontaneous polarization at 25° C. is 62.5 nC/cm², and the critical pulse area in the chevron geometry is 550 Vs/m. The mixture switches in multiplex operation with a 48% margin, has an effective switch angle 2 $\theta_{eff}$ of 27° and has a contrast ratio of 17:1.

EXAMPLE 4
A mixture consisting of:
| | Proportions by weight |
|---|---|
| 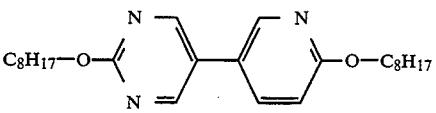 | 4.07 |
| 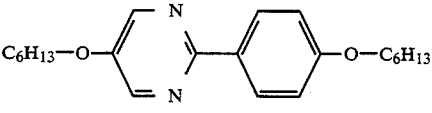 | 3.56 |
| 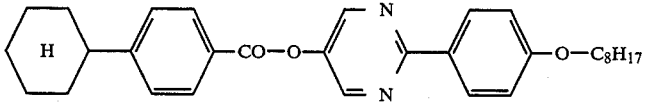 | 5.96 |
| 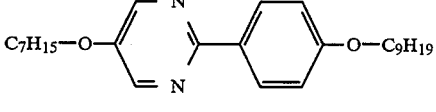 | 6.56 |
| 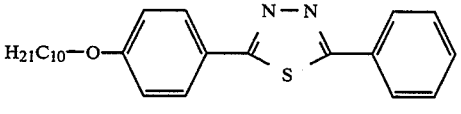 | 6.8 |
| 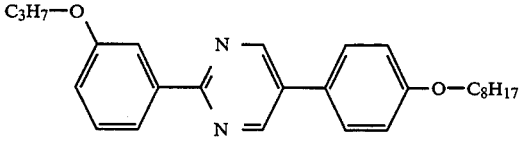 | 8.4 |
| 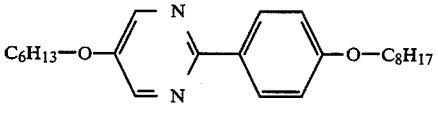 | 6.75 |
| 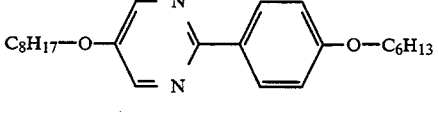 | 7.41 |
| 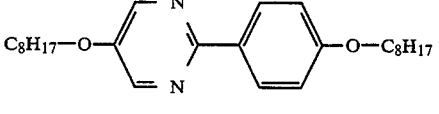 | 7.96 |
| 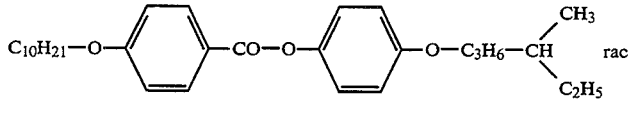 | 9.23 |
| 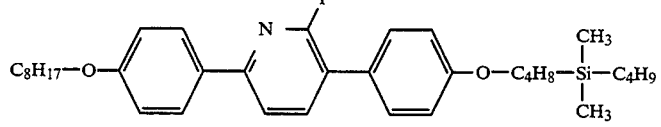 | 8.32 |
| 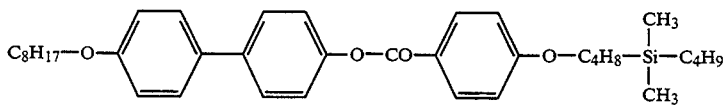 | 5.89 |

-continued

| Structure | Proportions by weight |
|---|---|
| $C_6H_{13}-O-\phenyl-CO-O-\phenyl(CH_3)-O-CO-\phenyl-O-C_6H_{13}$ | 2.61 |
| $C_4H_9-\text{epoxide}^{**}-CH_2-O-\text{pyrimidine}-\phenyl-O-CO-\text{cyclohexyl}-C_5H_{11}$ trans | 5.25 |
| $C_8H_{17}-O-\text{pyrimidine}-\phenyl-O-CO-\text{epoxide}^{**}-C_3H_7$ cis | 2.59 |
| $C_8H_{17}-O-\text{pyrimidine}-\phenyl-O-CO-CH(*)-C(CH_3)_2-O$ (dioxolane) | 2.51 |
| $C_4H_9-\text{epoxide}^{}-CH_2-O-\text{pyrimidine}-\phenyl-O-CH_2-\text{epoxide}^{}-C_4H_9$ trans | 2.61 |
| $C_6H_{13}-O-\phenyl-\text{pyrazine}-\phenyl-O-CO-\text{epoxide}^{**}-C_3H_7$ cis | 2.74 |
| Crown ether with $N-C(=O)-C(CH_3)_3$ group | 0.78 | has the following liquid-crystalline phase ranges:

X - 36 S*$_c$ 75 S$_A$ 89 N* 100 I.

The spontaneous polarization at 25° C. is 49 nC/cm², and the critical pulse area in the chevron geometry is 750 Vs/m. The mixture switches in multiplex operation with a 47% margin, has an effective switch angle 2 $\theta_{eff}$ of 27° and has a contrast ratio of 22:1.

EXAMPLE 5

A mixture consisting of:

has the following liquid-crystalline phase ranges:

X - 15 S*$_c$ 69 S$_A$ 74 N* 80 I.

The spontaneous polarization at 25° C. is 28 nC/cm², and the critical pulse area in the chevron geometry is 600 Vs/m. The mixture switches in multiplex operation with a 40% margin, has an effective switch angle 2 $\theta_{eff}$ of 29° and has a contrast ratio of 15:1.

EXAMPLE 6

A mixture consisting of:

| Structure | Proportions by weight |
|---|---|
| $C_8H_{17}-O-\text{pyrimidine}-\text{pyridine}-O-C_8H_{17}$ | 4.04 |

| | Proportions by weight |
|---|---|
| 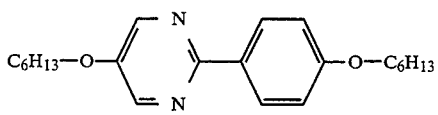 C6H13—O—[pyrimidine]—[phenyl]—O—C6H13 | 3.53 |
| 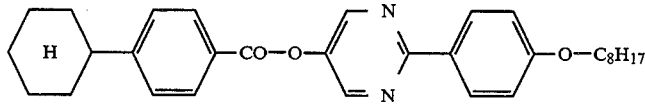 H—[cyclohexyl]—[phenyl]—CO—O—[pyrimidine]—[phenyl]—O—C8H17 | 5.91 |
| 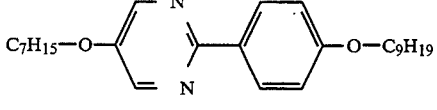 C7H15—O—[pyrimidine]—[phenyl]—O—C9H19 | 6.50 |
| 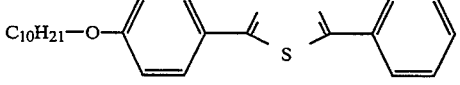 C10H21—O—[phenyl]—[thiadiazole]—[phenyl] | 6.73 |
| 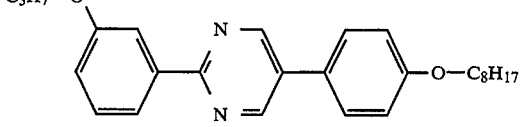 C3H7—O—[phenyl]—[pyrimidine]—[phenyl]—O—C8H17 | 6.68 |
| 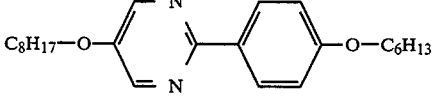 C8H17—O—[pyrimidine]—[phenyl]—O—C6H13 | 7.32 |
| 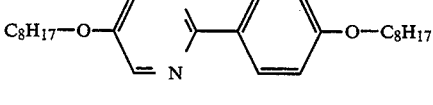 C8H17—O—[pyrimidine]—[phenyl]—O—C8H17 | 7.88 |
| 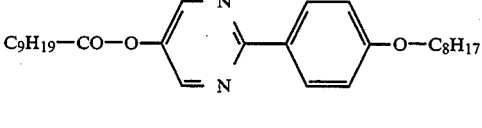 C9H19—CO—O—[pyrimidine]—[phenyl]—O—C8H17 | 7.85 |
| 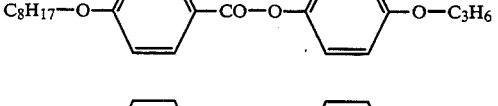 C8H17—O—[phenyl]—CO—O—[phenyl]—O—C3H6 | 7.50 |
| 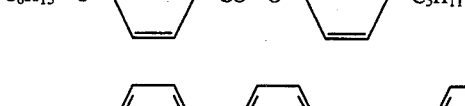 C6H13—O—[phenyl]—CO—O—[phenyl]—C5H11 | 5.35 |
| 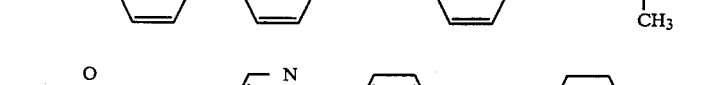 C8H17—O—[phenyl]—[phenyl]—O—CO—[phenyl]—O—C4H8—Si(CH3)2—C4H9 | 4.98 |
| 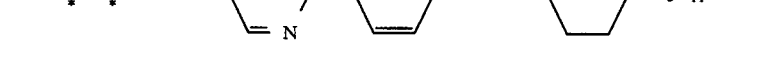 C4H9—[epoxide]—CH2—O—[pyrimidine]—[phenyl]—O—CO—[cyclohexyl-H]—C5H11 trans | 4.00 |

|  | Proportions by weight |
|---|---|
| 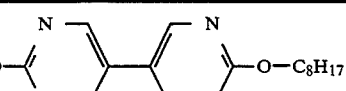 C₈H₁₇—O—[pyrimidine]—[phenyl]—O—CO—[epoxide]—C₃H₇ cis | 3.45 |
| C₈H₁₇—O—[pyrimidine]—[phenyl]—O—CO—[CH with O]—C(CH₃)₂—O | 3.35 |
| C₄H₉—[epoxide]—CH₂—O—[pyrimidine]—[phenyl]—O—CH₂—[epoxide]—C₄H₉ trans | 4.5 |
| C₆H₁₃—O—[phenyl]—[pyrimidine]—[phenyl]—O—CO—[epoxide]—C₃H₇ cis | 3.65 |
| [crown ether with N—C(O)—C(CH₃)₃ substituent] | 0.78 | has the following liquid-crystalline phase ranges:

X - 28 S*$_C$ 69 S$_A$ 84 N* 95 I.

The spontaneous polarization at 25° C. is 53 nC/cm², and the critical pulse area in the chevron geometry is 350 Vs/m. The mixture switches in multiplex operation with a 60% margin, has an effective switch angle 2 $\theta_{eff}$ of 25° and has a contrast ratio of 20:1.

EXAMPLE 7

A mixture consisting of:

|  | Proportions by weight |
|---|---|
| C₈H₁₇—O—[pyrimidine]—[pyridine]—O—C₈H₁₇ | 4.06 |
| C₆H₁₃—O—[pyrimidine]—[phenyl]—O—C₆H₁₃ | 3.55 |
| [cyclohexyl]—[phenyl]—CO—O—[pyrimidine]—[phenyl]—O—C₈H₁₇ | 5.94 |
| C₇H₁₅—O—[pyrimidine]—[phenyl]—O—C₉H₁₉ | 6.53 |

| -continued | Proportions by weight |
|---|---|
| C₁₀H₂₁—O—⟨phenyl⟩—C(=N—N)—S—⟨phenyl⟩ (1,3,4-thiadiazole) | 6.78 |
| C₃H₇—O—⟨phenyl⟩—⟨pyrimidine⟩—⟨phenyl⟩—O—C₈H₁₇ | 8.37 |
| C₆H₁₃—O—⟨pyrimidine⟩—⟨phenyl⟩—O—C₈H₁₇ | 6.74 |
| C₈H₁₇—O—⟨pyrimidine⟩—⟨phenyl⟩—O—C₆H₁₃ | 7.39 |
| C₈H₁₇—O—⟨pyrimidine⟩—⟨phenyl⟩—O—C₈H₁₇ | 7.94 |
| C₈H₁₇—O—⟨pyrimidine⟩—⟨phenyl⟩—O—CO—CH(O-cyclohexylidene-O)—CH₂   rac | 2.00 |
| C₁₀H₂₁—O—⟨phenyl⟩—CO—O—⟨phenyl⟩—O—C₃H₆—CH(CH₃)—C₂H₅   rac | 9.20 |
| C₈H₁₇—O—⟨phenyl⟩—⟨2-fluoropyridine⟩—⟨phenyl⟩—O—C₄H₈—Si(CH₃)₂—C₄H₉ | 8.30 |
| C₈H₁₇—O—⟨phenyl⟩—⟨phenyl⟩—O—CO—⟨phenyl⟩—O—C₄H₈—Si(CH₃)₂—C₄H₉ | 5.88 |
| C₆H₁₃—O—⟨phenyl⟩—CO—O—⟨(methyl)phenyl⟩—O—CO—⟨phenyl⟩—O—C₆H₁₃ | 2.60 |
| C₈H₁₇—O—⟨pyrimidine⟩—⟨phenyl⟩—O—CO—CH(*)—CH(*)—C₃H₇ (epoxide)   cis | 2.76 |
| C₈H₁₇—O—⟨pyrimidine⟩—⟨phenyl⟩—O—CO—CH(*)—CH₂—O—C(CH₃)₂—O (dioxolane) | 2.68 |

| | Proportions by weight |
|---|---|
| $C_4H_9$—[epoxide]—$CH_2$—O—[pyrimidine]—[phenyl]—O—$CH_2$—[epoxide]—$C_4H_9$ trans | 5.58 |
| $C_6H_{13}$—O—[phenyl]—[pyrimidine]—[phenyl]—O—CO—[epoxide]—$C_3H_7$ cis | 2.92 |
| [cryptand with N—CO—C(CH$_3$)$_3$ group] | 0.78 | has the following liquid-crystalline phase ranges:

X - 27 S*$_C$ 72 S$_A$ 89 N* 95 I.

The spontaneous polarization at 25° C. is 50 nC/cm², and the critical pulse area in the chevron geometry is 630 Vs/m. The mixture switches in multiplex operation with a 47% margin, has an effective switch angle 2 $\theta_{eff}$ of 27° and has a contrast ratio of 19:1.

EXAMPLE 8

A mixture consisting of:

| | Proportions by weight |
|---|---|
| $C_8H_{17}$—O—[pyrimidine]—[pyridine]—O—$C_8H_{17}$ | 3.66 |
| $C_6H_{13}$—O—[pyrimidine]—[phenyl]—O—$C_6H_{13}$ | 3.20 |
| H—[cyclohexyl]—[phenyl]—CO—O—[pyrimidine]—[phenyl]—O—$C_8H_{17}$ | 5.36 |
| $C_7H_{15}$—O—[pyrimidine]—[phenyl]—O—$C_9H_{19}$ | 5.89 |
| $H_{21}C_{10}$—O—[phenyl]—[thiadiazole]—[phenyl] | 6.11 |
| $C_3H_7$—O—[phenyl]—[pyrimidine]—[phenyl]—O—$C_8H_{17}$ | 7.55 |

|  | Proportions by weight |
|---|---|
| 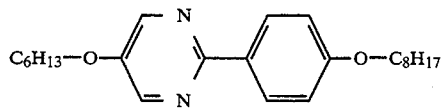 | 6.07 |
| 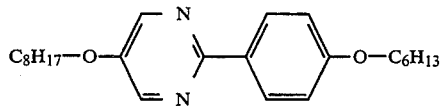 | 6.65 |
| 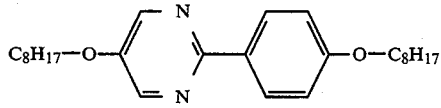 | 7.15 |
| 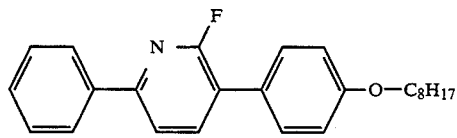 | 7.12 |
| 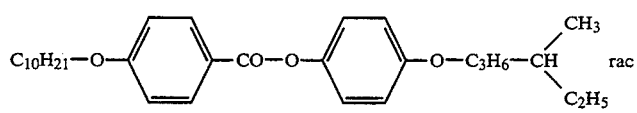 rac | 2.29 |
| 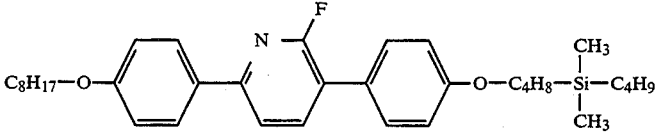 | 7.47 |
| 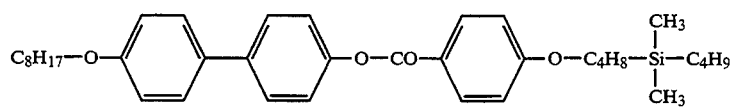 | 5.30 |
| 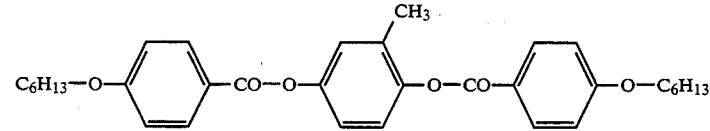 | 2.35 |
| 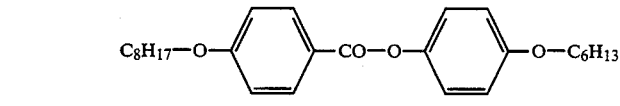 | 4.86 |
| 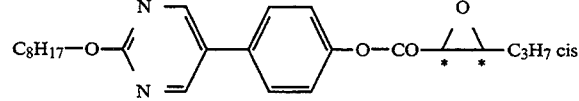 cis | 8.41 |
| 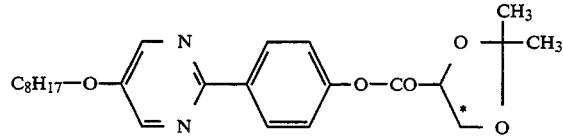 | 2.34 |
| 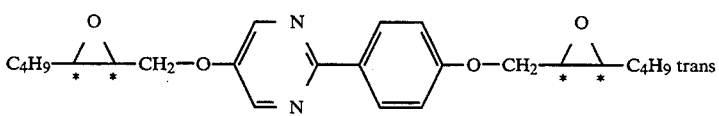 trans | 4.89 |

| | Proportions by weight |
|---|---|
| 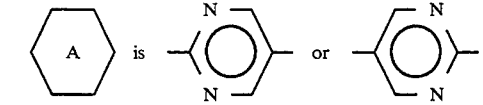 C₆H₁₃—O—⟨⟩—CO... —O—CO—△—C₃H₇ cis | 2.55 |
| 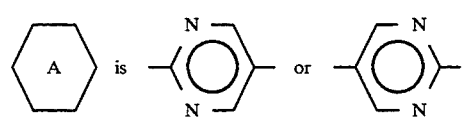 | 0.78 | has the following liquid-crystalline phase ranges:

X - 36 S*$_C$ 66 S$_A$ 85 N* 94 I.

The spontaneous polarization at 25° C. is 50 nC/cm², and the critical pulse area in the chevron geometry is 510 Vs/m. The mixture switches in multiplex operation with a 33% margin, has an effective switch angle 2 $\theta_{eff}$ of 25° and has a contrast ratio of 22:1.

The examples confirm that the mixtures according to the invention are particularly suitable for use in electro-optical switching and display elements.

We claim:

1. A liquid-crystalline mixture comprising
A. at least one compound of the formula I

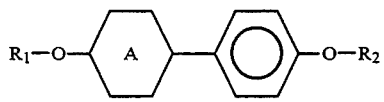
$R_1$—O—⟨A⟩—⟨⟩—O—$R_2$    (I)

in which
$R_1$ and $R_2$ are identical or different, straight-chain or branched alkyl groups having 1 to 18 or 3 to 18 carbon atoms respectively, where a CH₂ group adjacent to the oxygen can be replaced by —CO—, ⟨A⟩ is —⟨N=N⟩— or —⟨N=N⟩— and/or at least one compound of the formula (II)

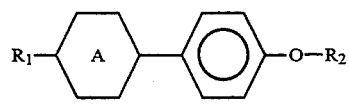
$R_1$—⟨A⟩—⟨⟩—O—$R_2$    (II)

in which
$R_1$ and $R_2$ are identical or different, branched or unbranched alkyl groups having 1 to 18 or 3 to 18 carbon atoms respectively, where a CH₂ group adjacent to the oxygen can also be replaced by —CO—, and ⟨A⟩ is —⟨N=N⟩— or —⟨N=N⟩—

B. at least one compound of the formula (III)
$R^1(\text{-}A^1)_a(\text{-}M^1)_b(\text{-}A^2)_c(\text{-}M^2)_d(\text{-}A^3)_e(\text{-}M^3)_f(\text{-}A^4)\text{-}H$    (III)

in which
$R^1$ is a straight-chain or branched alkyl radical having 1 to 22 or 3 to 22 carbon atoms respectively, where one or two non-adjacent CH₂ groups can also be replaced by —O—, —CO—, —CO—O—, —O—CO—, —O—CO—O— or —Si(CH₃)₂—, $A^1$, $A^2$, $A^3$ and $A^4$ are identical or different and are 1,4-phenylene, in which one or two H atoms can be replaced by F or CN, pyridine-2,5-diyl, in which one or two H atoms can be replaced by F, pyrimidine-2,5-diyl, in which one or two H atoms can be replaced by F, trans-1,4-cyclohexylene, 1,3,4-thiadiazole-2,5-diyl or naphthalene-2,6-diyl, $M^1$, $M^2$ and $M^3$ are identical or different and are —CO—O—, —O—CO—, —CH₂—O—, —O—CH₂— or —CH₂—CH₂—, and a, b, c, d, e and f are zero or one, with the proviso that the sum of a+c+e is 0, 1, 2 or 3;

C. and at least one compound of the formula (IV)

$R^1(—A^1)_a(—M^1)_b(—A^2)_c(—M^2)_d(—A^3)_e(—M^3)_f$—⟨X¹=X², X⁴=X³, R²⟩    (IV)

in which
$R^1$ and $R^2$ are identical or different, straight-chain or branched alkyl radicals having 1 to 22 or 3 to 22 carbon atoms respectively, where one or two non-adjacent —CH₂— groups can be replaced by —O—, —CO—, —CO—O—, —O—CO—, —O—CO—O— or —Si(CH₃)₂—, $A^1$, $A^2$ and $A^3$ are identical or different and are 1,4-phenylene, in which one or two H atoms can be replaced by F, pyridine-2,5-diyl, in which one or two H atoms can be replaced by F, pyrimidine-2,5-diyl, in which one or two H atoms can be replaced by F, trans-1,4-cyclohexylene, in which one or two H atoms can be replaced by —CN and/or —CH$_3$, or 1,3,4-thiadiazole-2,5-diyl, and A$^1$ is alternatively

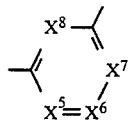

M$^1$, M$^2$ and M$^3$ are identical or different and are —O—, —CO—O—, —O—CO—, —CH$_2$—O—, —O—CH$_2$— or —CH$_2$—CH$_2$—, X$^1$, X$^2$, X$^3$, X$^4$, X$^5$, X$^6$, X$^7$ and X$^8$ are CH or N, where the number of N atoms in a six-membered ring is 0, 1 or 2, and a, b, c, d, e and f are zero or one, with the proviso that the sum a+c+e is 0, 1, 2 or 3.

2. A liquid-crystalline mixture as claimed in claim 1, wherein component A is a compound of the formula (I) and/or (II) in which the symbols have the following meanings:

R$^1$ and R$^2$ are identical or different, straight-chain or branched alkyl groups having 1 to 12 or 3 to 12 carbon atoms respectively, where a CH$_2$ group adjacent to the oxygen can also be replaced by —CO—, and

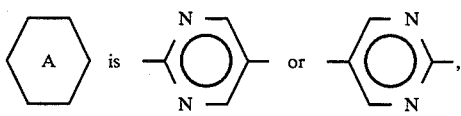

component B is a compound of the formula (III) in which

R$^1$ is a straight-chain alkyl radical having 1 to 14 carbon atoms, where one or two non-adjacent —CH$_2$— groups can also be replaced by —O—, —CO—O—, —O—CO—, —O—CO—O— or —Si(CH$_3$)$_2$—, and A$^1$, A$^2$, A$^3$ and A$^4$ are identical or different and are 1,4-phenylene, pyrimidine-2,5-diyl, in which one or two H atoms can be replaced by F, trans-1,4-cyclohexylene or 1,3,4-thiadiazole-2,5-diyl, and component C is a compound of the formula (IV) in which R$^1$ and R$^2$ are straight-chain alkyl radicals having 1 to 14 carbon atoms, where one or two non-adjacent CH$_2$ groups can also be replaced by —O—, —CO—, —CO—O—, —O—CO—, —O—CO—O— or —Si(CH$_3$)$_2$—, and A$^1$, A$^2$ and A$^3$ are identical or different and are 1,4-phenylene, pyrimidine-2,5-diyl, in which one or two H atoms can be replaced by F, trans-1,4-cyclohexylene or 1,3,4-thiadiazole-2,5-diyl.

3. A liquid-crystalline mixture as claimed in claim 1, which comprises, in addition to components A, B and C, at least one compound from groups D to G below;

D. silicon compounds of the formula (V)

R$^1$(-A$^1$)$_i$(-M$^1$)$_k$(-A$^2$)$_l$(-M$^2$)$_m$(-A$^3$)$_n$-R$^2$   (V)

in which

R$^1$ is straight-chain or branched alkyl having 1 to 22 or 3 to 22 carbon atoms respectively, where one or two non-adjacent CH$_2$ groups can also be replaced by —O—, —CO—, —CO—O—, —O—CO— or —O—CO—O—, R$^2$ is straight-chain or branched alkyl having 1 to 22 or 3 to 22 carbon atoms respectively, where one or two non-adjacent —CH$_2$— groups can also be replaced by —O—, —CO—, —CO—O—, —O—CO— or —O—CO—O—, with the proviso that one CH$_2$ group not bonded to oxygen has been replaced by —Si(CH$_3$)$_2$—, A$^1$, A$^2$ and A$^3$ are identical or different and are 1,4-phenylene, in which one or two H atoms can be replaced by F, trans-1,4-cyclohexylene, pyridine-2,5-diyl, in which one or two H atoms can be replaced by F, pyrimidine-2,5-diyl, in which one or two H atoms can be replaced by F, or 1,3,4-thiadiazole-2,5-diyl, M$^1$ and M$^2$ are identical or different and are —CO—O—, —O—CO—, —CH$_2$—O— or —O—CH$_2$—, and i, k, l, m and n are zero or 1, with the proviso that i+1+n=2 or 3;

E. hydroquinone derivatives of the formula (VI)

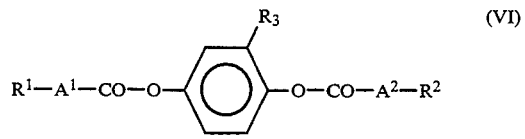

in which

R$^1$ and R$^2$ are identical or different, straight-chain or branched alkyl radicals having 1 or 3 to 16 carbon atoms respectively, where one or two non-adjacent —CH$_2$— groups can also be replaced by —O—, —CO—, —O—CO—, —CO—O— or —O—CO—O—, R$^3$ is —CH$_3$, CF$_3$ or —C$_2$H$_5$, A$^1$ and A$^2$ are identical or different and are

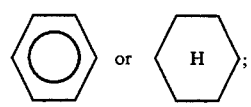

F. pyridylpyrimidines of the formula (VII)

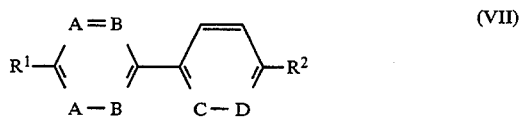

in which

A is N and B is CH or A is CH and B is N, C is N and D is CH or C is CH and D is N, where one or two CH groups can be replaced by CF groups, and R$^1$ and R$^2$ are identical or different, straight-chain or branched alkyl radicals having 1 to 22 or 3 to 22 carbon atoms respectively, where one or two non-adjacent —CH$_2$— groups can also be replaced by —O—, —CO—, —CO—O—, —O—CO— or —O—CO—O—; and G. phenylbenzoates of the formula (VIII)

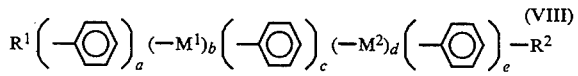

in which
- R$^1$ and R$^2$ are identical or different, straight-chain or branched alkyl radicals having 1 to 22 or 3 to 22 carbon atoms respectively, where one or two non-adjacent —CH$_2$— groups can also be replaced by —O—, —CO—, —CO—O—, —O—CO— or —O—CO—O—,
- M$^1$ and M$^2$ are identical or different and are —CO—O— or —O—CO—, and
- a, b, c, d and e are zero or one, with the proviso that a+c+e=2 or 3 and b+d=1 or 2.

4. A liquid-crystalline mixture as claimed in claim 1, which comprises at least one compound from each of groups D to G.

5. A liquid-crystalline mixture as claimed in claim 1, which is ferroelectric and which comprises at least two optically active compounds from groups H to L below:

H. optically active phenylbenzoates of the formula (IX)

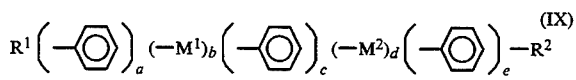

in which
- R$^1$ and R$^2$ are identical or different, straight-chain or branched alkyl radicals having 1 to 22 or 3 to 22 carbon atoms respectively, where one or two non-adjacent —CH$_2$— groups can also be replaced by —O—, —CO—, —CO—O—, —O—CO— or —O—CO—O—, and in which at least one of the radicals R$^1$ and R$^2$ is a branched, optically active alkyl group,
- M$^1$ and M$^2$ are identical or different and are —CO—O—, —O—CO— or a single bond, and
- a, b, c, d and e are zero or one, with the proviso that the sum a+c+e is 2 or 3 and b+d is 1 or 2;

I. optically active oxirane ethers of the formula (X)

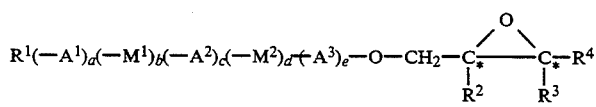

in which the symbols and indices have the following meanings:
- * is a chiral center,
- R$^1$ is a straight-chain or branched alkyl radical having 1 to 22 or 3 to 22 carbon atoms respectively, where one or two non-adjacent —CH$_2$— groups can also be replaced by —O—, —CO—, —CO—O—, —C—CO—, —O—CO—O— or —Si(CH$_3$)$_2$, or the following optically active group:

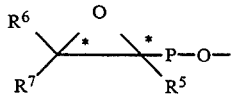

- R$^2$, R$^3$, R$^4$, R$^5$, R$^6$ and R$^7$ are identical or different and are H or a straight-chain or branched alkyl radical having 1 to 16 carbon atoms,
- P is —CH$_2$— or —CO—,
- A$^1$, A$^2$ and A$^3$ are identical or different and are 1,4-phenylene, in which one or two H atoms can be replaced by F, pyridine-2,5-diyl, in which one or two H atoms can each be replaced by F, pyrimidine-2,5-diyl, in which one or two H atoms can be replaced by F, trans-1,4-cyclohexylene, in which one or two H atoms can be replaced by —CN and/or —CH$_3$, or 1,3,4-thiadiazole-2,5-diyl,
- M$^1$ and M$^2$ are identical or different and are —CO—O—, —O—CO—, —CH$_2$—O—, —O—CH$_2$— or —CH$_2$—CH$_2$—, and
- a, b, c, d and e are zero or 1;

J. optically active oxirane esters of the formula (XI)

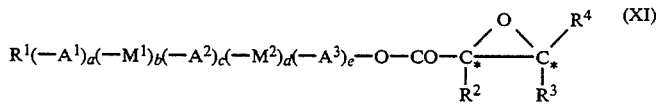

where the symbols and indices have the following meanings:
- * is a chiral center,
- R$^1$ is a straight-chain or branched alkyl radical having 1 to 22 or 3 to 22 carbon atoms respectively, where one or two non-adjacent —CH$_2$— groups can also be replaced by —O—, —CO—, —CO—O—, —O—CO—, —O—CO—O— or —Si(CH$_3$)$_2$—,
- R$^2$, R$^3$ and R$^4$ are identical or different and are H or a straight-chain or branched alkyl radical having 1 to 16 carbon atoms,
- A$^1$, A$^2$ and A$^3$ are identical or different and are 1,4-phenylene, in which one or two H atoms can be replaced by F, pyridine-2,5-diyl, in which one or two H atoms can be replaced by F, pyrimidine-2,5-diyl, in which one or two H atoms can be replaced by F, trans-1,4-cyclohexylene, in which one or two H atoms can be replaced by —CN and/or —CH$_3$, or 1,3,4-thiadiazole-2,5-diyl,
- M$^1$ and M$^2$ are identical or different and are —CO—O—, —O—CO—, —CH$_2$—O—, —O—CH$_2$— or —CH$_2$—CH$_2$—,
- a, b, c, d and e are zero or one;

K. Optically active dioxolane ethers of the formula (XII)

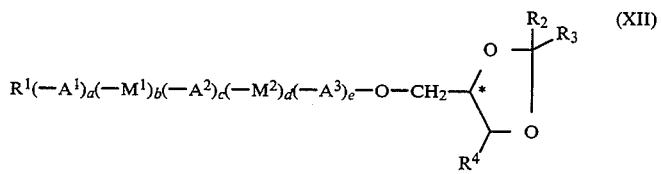

(XII)

where the symbols and indices have the following meanings:
* is a chiral center,
$R^1$ is a straight-chain or branched alkyl radical having 1 to 22 or 3 to 22 carbon atoms respectively, where one or two non-adjacent —$CH_2$— groups can also be replaced by —O—, —CO—, —CO—O—, —O—CO—, —O—CO—O— or —Si($CH_3$)$_2$—,
$R^2$, $R^3$ and $R^4$ are identical or different and are H, a straight-chain or branched alkyl radical having 1 to 16 or 3 to 10 carbon atoms respectively or an alkenyl radical having 2 to 16 carbon atoms, where $R^2$ and $R^3$ together may alternatively be —($CH_2$)$_5$—,
$A^1$, $A^2$ and $A^3$ are identical or different and are 1,4-phenylene, in which one or two H atoms can be replaced by F, pyridine-2,5-diyl, in which one or two H atoms can be replaced by F, pyrimidine-2,5-diyl, in which one or two H atoms can be replaced by F, trans-1,4-cyclohexylene, in which one or two H atoms can be replaced by —CN and/or —$CH_3$, or 1,3,4-thiadiazole-2,5diyl,
$M^1$ and $M^2$ are identical or different and are —CO—O—, —O—CO—, —$CH_2$—O—, —O—$CH_2$— or —$CH_2$—$CH_2$—, and
a, b, c, d and e are zero or one;
L. optically active dioxolane esters of the formula (XIII)

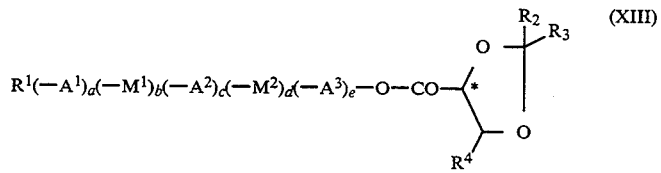

(XIII)

in which
$R^1$ is a straight-chain or branched alkyl radical having 1 to 16 or 3 to 16 carbon atoms respectively, where one or more non-adjacent —$CH_2$— groups can also be replaced by —O—, —CO—, —O—CO— or —CO—O—,
$R^2$, $R^3$ and $R^4$ are identical or different and are H, an alkyl radical or an alkenyl radical having 1 to 10 or 2 to 10 carbon atoms respectively, where $R^2$ and $R^3$ together can alternatively be —($CH_2$)$_5$—,
$A^1$, $A^2$ and $A^3$ are identical or different and are 1,4-phenylene, in which one or two H atoms can be replaced by F, pyridine-2,5-diyl, in which one or two H atoms can be replaced by F, pyrimidine-2,5-diyl, in which one or two H atoms can be replaced by F, trans-1,4-cyclohexylene, in which one or two H atoms can be replaced by —CN and/or —$CH_3$, or 1,3,4-thiadiazole-2,5-diyl,
$M^1$ and $M^2$ are identical or different and are —CO—O—, —O—CO—, —$CH_2$—O—, —O—$CH_2$— or —$CH_2$—$CH_2$—, and
a, b, c, d and e are zero or one.

6. A ferroelectric, liquid-crystalline mixture as claimed in claim 5, which comprises at least one compound from each of three of groups H to L.

7. A ferroelectric, liquid-crystalline mixture as claimed in claim 5, which comprises at least one compound from group M:
M: macrocyclic compounds of the formula (XIV)

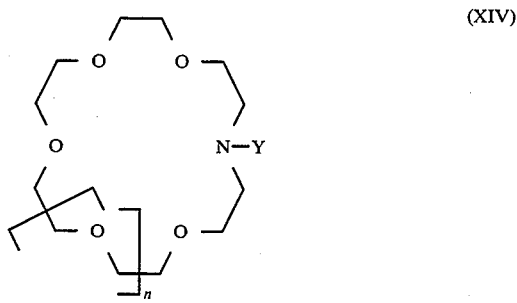

(XIV)

where
n is 0 or 1, and
y is —CO— (t-butyl) or —CO— (adamantyl).

8. A liquid crystalline mixture as claimed in claim 1, wherein the proportions of the individual components, in percent by weight, are:

A: 5 to 80%,
B: 1 to 40%,
C: 1 to 25%
D: 0 to 40%,
E: 0 to 15%,
F: 0 to 20%,
G: 0 to 30%,
H: 0 to 15%,
I: 0 to 20%,
J: 0 to 20%,
K: 0 to 10%,
L: 0 to 15%,
M: 0 to 10%.

9. A method of use for a ferroelectric liquid-crystalline mixture as claimed in claim 5 comprises filling it into an electro-optical switching and display derice in which it is surrounded on both sides by layers which comprise at least one alignment layer, electrodes and limiting plates.

10. An electro-optical switching and display device comprising a liquid-crystalline mixture as claimed in claim 1.

* * * * *